United States Patent Office 2,999,353
Patented Sept. 12, 1961

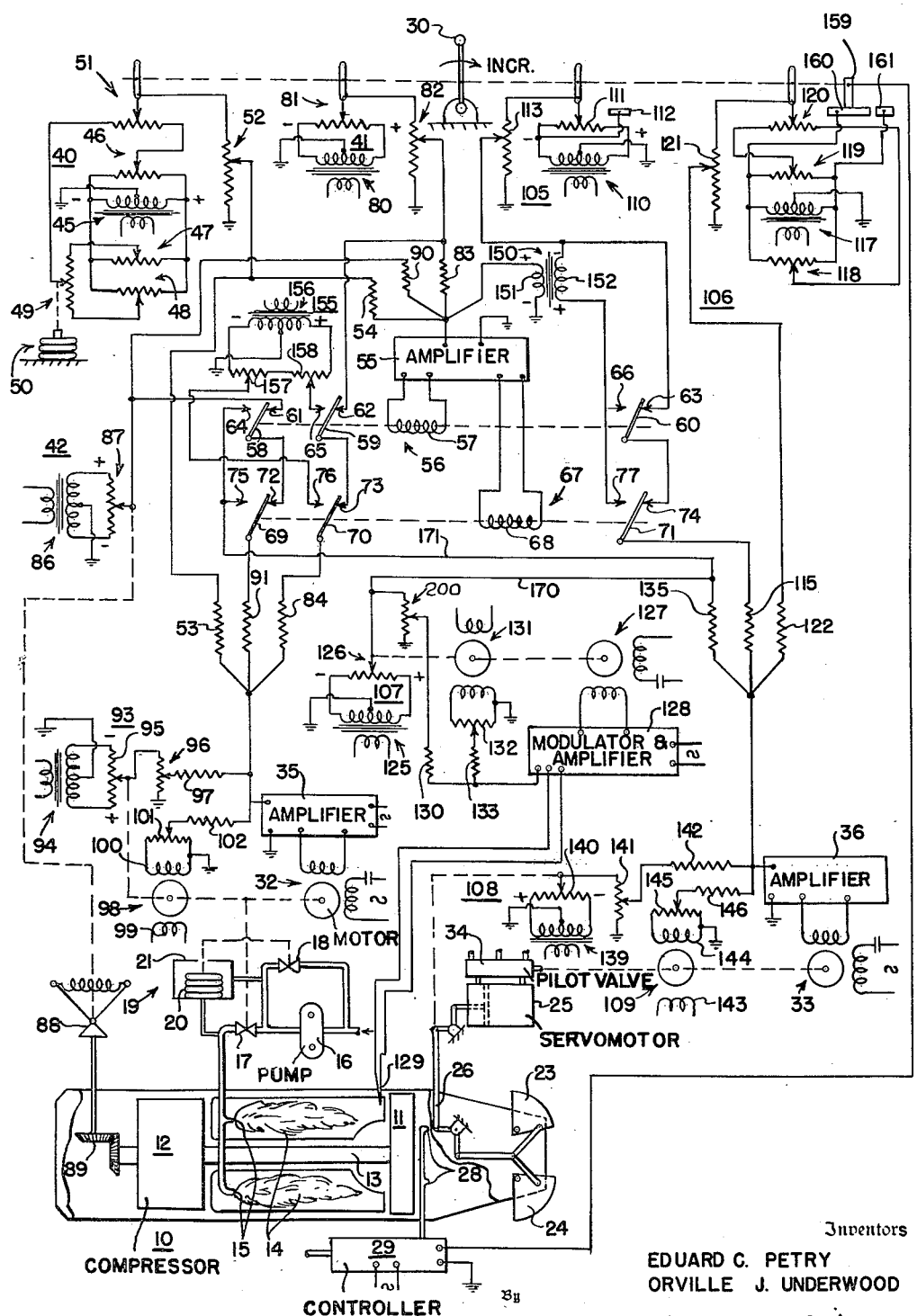

2,999,353
INTERRELATED MAIN FUEL CONTROL AND NOZZLE AREA CONTROL
Eduard C. Petry and Orville J. Underwood, Minneapolis, Minn., assignors to Minneapolis-Honeywell Regulator Company, Minneapolis, Minn., a corporation of Delaware
Filed July 15, 1950, Ser. No. 174,022
25 Claims. (Cl. 60—35.6)

The present invention is concerned with an improved type of control apparatus for a combustion engine of the gas turbine or jet type. More particularly, the present invention is concerned with an electrical type of control system for a combustion engine where the control of the output of the engine may be regulated by regulating fuel flow and gas flow through the engine.

In controlling gas turbine engines of the jet type where the driving force for the engine is obtained from the acceleration of the gases passing through the engine, there are many problems arising in the correlation of the various functions which affect engine operation. Some of these problems arise in coordinating the fuel flow and the exhaust nozzle area of the controlled engine during steady state operation. Other problems arise when the controlled engine is being accelerated or decelerated from a steady state condition. In the copending application of Benjamin H. Ciscel et al., Serial No. 157,304, filed April 21, 1950, now Patent No. 2,760,337, there is shown a method of controlling a gas turbine where fuel flow to the combustion chamber of the turbine is normally under control of an apparatus responsive to the speed of the turbine. In the Ciscel et al. application, when engine acceleration is required the speed control portion of the control apparatus is no longer effective to control fuel flow and the engine temperature responsive control is substituted for the speed control. In a further copending application of Alex B. Chudyk, Serial No. 180,335, filed Aug. 19, 1950, now Patent No. 2,776,536, there is shown a modified control apparatus wherein the exhaust outlet area of a combustion engine is controlled. In the Chudyk application the control apparatus is so arranged that the speed control is normally in control of the fuel flow to the engine while engine temperature is the controlling function for the exhaust outlet control. Upon the occurrence of an acceleration condition, the fuel flow control is put under control of the engine temperature while the exhaust nozzle area control is moved to a predetermined set position which is independent of any controlling function.

In the present control system it is desired that provision be made to prevent the controlled engine from overheating during acceleration and to prevent blowout of the burner flame during deceleration of the controlled engine. Further, it is desired to modulatingly control the exhaust outlet area of the engine during acceleration conditions so that the area will be varied by an amount proportional to the difference between a selected speed of the controlled engine and an actual speed of the controlled engine. The present invention further contemplates an improved type of altitude bias control which is arranged to maintain the engine speed within certain operating limits regardless of the altitude of the engine. This altitude biasing signal is arranged to maintain the idling speed of the engine above predetermined values dependent upon the altitude of the engine and is so arranged that the positioning of a power selecting level will have no indication as to what the particular idle biasing signal might be.

Further, when the controlled engine has an afterburner provided therefor it is desirable that the exhaust nozzle area control be moved to the wide open position upon the afterburner becoming operative. To relieve the operator from the burden of having to specially control the exhaust air control when the afterburner is operating it is necessary that the exhaust nozzle area control be moved to the wide open position automatically.

It is therefore an object of the present invention to provide an improved control apparatus for a combustion engine where the fuel flow to the engine during steady state is controlled by engine speed and the exhaust nozzle area of or gas flow through the engine is controlled by engine temperature until such time as the engine speed error deviates from a predetermined value when the exhaust nozzle area or gas flow control will be controlled in accordance with engine speed and the fuel flow will be controlled by engine temperature.

A further object of the present invention is to provide a control apparatus which will sense conditions of acceleration and deceleration of the controlled engine and regulate the fuel flow to the engine and the gas flow through the engine accordingly.

Another object of the present invention is to provide a control apparatus for a combustion engine having a fuel flow control and a gas flow control with an engine speed controller normally in control of the fuel flow and an engine temperature controller normally in control of the gas flow where, upon a predetermined acceleration or deceleration condition existing, the control apparatus will transfer the control of the speed controller to the gas flow control and the temperature controller to the fuel control.

Still another object of the present invention is to provide an improved control apparatus wherein an altitude biasing signal is provided to maintain the speed of the engine when idling above a safe value.

Still another object of the present invention is to provide a motor control apparatus having first and second controlled motors, the first being controlled by a first condition responsive means and the second being controlled by a second responsive means with a transfer control means arranged to transfer the first condition responsive means to control the second motor means and the second responsive means to control the first motor means.

These and other objects of the present invention will be understood upon considering the following specification and appended drawing.

Referring to the drawing, the numeral 10 represents a gas turbine engine of the jet type. This engine comprises a turbine 11 which is effective to drive a compressor 12 by means of an interconnecting shaft 13. The driving energy for the turbine 11 originates with heated gases present in the combustion chamber 14. Fuel for the combustion chamber 14 is supplied thereto by nozzles 15. Fuel is pumped to the nozzles 15 by means of a pump 16 which may be driven by any suitable means, not shown. The regulation of the output of this pump is controlled by a series regulating valve 17 and a by-pass regulating valve 18. The by-pass valve 18 is regulated by a pressure regulator 19 which comprises a bellows 20 mounted within a sealed box 21. The outer side of the bellows 20 is exposed to fuel pressure upstream of the series regulating valve 17 while the inside of the bellows is exposed to fuel pressure downstream of the regulating valve 17. This type of regulating valve system makes is possible to maintain the main fuel pump pressure as closely equal to fuel nozzle demand pressure as is consistent with optimum performance of the entire fuel control system.

The outlet nozzle area of the engine 10 may be variably controlled by a pair of "eyelids" or shutters 23 and 24 which may be variably positioned by hydraulic servomotor 25 acting through a suitable linkage and toggle arrangement 26. The afterburner nozzles 28 have been positioned downstream of the turbine 11 and the fuel flow thereto may be regulated by a controller indicated generally by the numeral 29.

For coordinating the positioning of the fuel regulating valve 17 and the eyelids 23 and 24, a power lever 30 has been provided. This power lever is arranged to select a desired setting for engine speed which the present system will effect by causing the reversible operation of a motor 32 which is coupled to the regulating valve 17. The power selector 30 is also effective to control a temperature control motor 33 which operates to position a pilot valve 34 associated with the hydraulic servomotor 25.

The control signals for the speed control motor 32 and the temperature control motor 33 are derived from a plurality of alternating current electrical networks each of which has an alternating current output signal which is fed through suitable summing resistors into the input of an amplifier where the signals are compared in phase and amplitude, are amplified, and are used to reversibly control a two-phase reversible motor connected to the output of the amplifier. The amplifier-motor combination may be of either type disclosed in the A. P. Upton Patent, 2,423,534, issued July 8, 1947. There are two main control channels in this apparatus, a speed control channel, and a temperature control channel. The signals from the speed control channel are normally fed into an amplifier 35 which is arranged to reversibly drive the motor 32. The signals from the temperature control channel are normally fed into an amplifier 36 which is effective to reversibly drive the motor 33.

Considering first the speed control channel, it will be seen that this channel comprises a speed calibrating network 40, a speed selecting network 41, and a speed indicating network 42. The speed calibrating network 40 will be seen to comprise a transformer 45 having a tapped secondary winding with its end terminals connected to the end terminals of a maximum speed calibration potentiometer 46, a high altitude idle bias potentiometer 47, and a low altitude idle speed bias potentiometer 48. The sliders of the potentiometers 47 and 48 are connected to the end terminals of an altitude bias fader potentiometer 49 whose slider is arranged to be positioned by an altitude responsive bellows 50. The slider of this altitude fader potentiometer is connected to one end of a fader potentiometer 51 positioned by speed selector lever 30. The other end of the fader potentiometer 51 is connected to the slider of the maximum speed calibrating potentiometer 46. The output from the calibration network 40 is taken from the slider of the fader potentiometer 51 through a sensitivity potentiometer 52 and from there is fed into the input of amplifier 35 through a suitable summing resistor 53. The control signals from the network 40 are also fed from the sensitivity potentiometer 52 through a suitable summing resistor 54 to the input of a transfer control amplifier 55.

This transfer control amplifier 55 may be of the type disclosed in the above mentioned Upton patent wherein the output of the amplifier is used to energize a pair of relays 56 and 67. One or the other of these relays will be energized depending upon the alternating current phasing of the signal applied to the input of the amplifier 55. The relay 56 comprises a relay winding 57 and a plurality of switch blades 58, 59 and 60 which are normally biased into engagement with contacts 61, 62, and 63, respectively. When the relay winding is energized, the switch blades 58, 59 and 60 will move into engagement with switch contacts 64, 65, and 66 respectively. The relay 67 comprises a relay winding 68 and a plurality of switch blades 69, 70, and 71 which are normally biased into engagement with associated switch contacts 72, 73, and 74. When winding 68 is energized the switch blades 69, 70, and 71 are normally moved into engagement with associated contacts 75, 76, and 77.

The speed selecting network 41 comprises a transformer 80 having a center tapped secondary winding whose end terminals are connected to a speed selecting potentiometer 81. The output from the network is fed from the wiper of potentiometer 81 through a sensitivity potentiometer 82 and through a summing resistor 83 into the input of amplifier 55 and through switch contact 62, switch blade 59, switch contact 73 and switch blade 70 and summing resistor 84 into the input of amplifier 35.

The speed indicating network 42 comprises a transformer 86 having a center tapped secondary winding whose end terminals are connected to a speed indicating potentiometer 87. The slider of this potentiometer is arranged to be positioned by a suitable speed indicating device indicated generally as 88, the latter of which is arranged to be driven by the engine 10 through gearing 89. The output from the network 42 is taken from the slider of the potentiometer 87 and is fed through a summing resistor 90 into the input of amplifier 55 and is also fed through switch contact 61, switch blade 58, switch contact 72, switch blade 69 and summing resistor 91 into the input amplifier 35.

Another signal source for the amplifier 35 is derived from the followup network 93. This network comprises a transformer 94 having a center tapped secondary winding with the end terminals thereof connected to a followup potentiometer 95. The slider of this potentiometer 95 is arranged to be positioned by the motor 32 as it adjusts valve 17. The output from network 93 is fed from the slider of the potentiometer 95 through a sensitivity control potentiometer 96 and through a summing resistor 97 into the input of amplifier 35.

A further signal source for the amplifier 35 is obtained from the velocity generator 98 which comprises a power winding 99 and an output winding 100. The output winding 100 is connected to the end terminals of a sensitivity potentiometer 101 and the slider of potentiometer 101 is connected through a summing resistor 102 to the input of amplifier 35. The rotor of the velocity generator 98 is arranged to be driven by the motor 32 and this generator will have an output voltage whose magnitude will be dependent upon the speed of operation of the motor 32 and whose phase will be dependent upon the direction of rotation of the motor. The main purpose of the velocity generator is for stabilization purposes in the control system to prevent hunting and overshooting of the control.

The control signals for the temperature control channel arise from the temperature selecting network 105, the temperature calibrating network 106, the temperature indicating network 107, followup network 108, and the velocity generator 109. As in the speed control channel, the signals from these various networks are all added by parallel addition through suitable summing resistors and the signals are applied to the input of the amplifier 36.

The temperature selecting network 105 comprises a transformer 110 having a tapped secondary winding whose end terminals are connected to the ends of a temperature selecting potentiometer 111. A slider of this potentiometer is arranged to be positioned by the power lever 30 and also serves as the output terminal for the network. A contacting segment 112 is provided for establishing a contact point for the slider of the potentiometer 111 which, when the slider is engaging the segment, will effectively connect the slider to the opposite end of the potentiometer 111. The output from the network 105 is fed through a sensitivity control potentiometer 113, through switch contact 63, switch blade 60, switch contact 74, switch blade 71, and summing resistor 115 into the input of amplifier 36.

The calibration network 106 comprises a power transformer 117 having a secondary winding with a grounded center tap. The end terminals of the secondary winding are connected to the end terminals of a maximum operating temperature calibrating potentiometer 118 and a minimum operating temperature calibrating potentiometer 119. The sliders of the calibration potentiometers 118 and 119 are connected to the end terminals of a fader potentiometer 120, the slider of which is arranged to be positioned by the power lever 30. The output taken from the slider potentiometer 120 is fed through a sensitivity control potentiometer 121 and a summing resistor 122 into the input of amplifier 36.

The temperature indicating network 107 comprises a power transformer 125 having a center tapped secondary winding whose end terminals are connected to the temperature indicating potentiometer 126. The slider of this potentiometer is arranged to be positioned by a motor 127. Motor 127 is arranged to be driven by the modulator and amplifier 128 which derives its main control signal from a temperature responsive element which may be a thermocouple 129, the latter of which is positioned on the upstream side of the turbine 11 of engine 10. This modulator and amplifier 128 and the motor 127 may be of the type disclosed in the Jones Patent No. 2,306,479, issued December 29, 1942. The modulator-amplifier 128 derives the followup signal from the network 107 through a sensitivity potentiometer 200 and a summing resistor 130. An anti-hunting stabilizing signal is derived from a velocity generator 131 whose output is fed through a sensitivity potentiometer 132 and summing resistor 133 into the amplifier portion of the apparatus. The output from the temperature indicating potentiometer 126 is also fed through a summing resistor 135 into the input of amplifier 36. It is thus seen that the anti-hunt stabilizing signal derived from the velocity generator 131 is also fed through the summing resistor 133, the summing resistor 130, the sensitivity potentiometer 200, the summing resistor 135 into the input of the amplifier 36.

The followup network 108 comprises a power transformer 139 having a center tapped secondary winding with the end terminals thereof connected to a potentiometer 140. The output from the followup potentiometer is fed through a sensitivity potentiometer 141 and through a summing resistor 142 to the input of amplifier 36.

The velocity generator 109 has an input winding 143 and an output winding 144, the latter of which is connected to the end terminals of a sensitivity potentiometer 145. The output of the potentiometer 145 is fed through a suitable summing resistor 146 to the input of amplifier 36.

Associated with the transfer portion of the apparatus is a transfer transformer 150 which is used for signal reversing purposes and for isolating purposes. Transformer 150 comprises a primary winding 151 and a secondary winding 152.

A further calibration network 155 is provided for use when the control is in the transient state of operation. This network comprises a transformer 156 having a center tapped secondary winding with the end terminals thereof connected to a pair of series connected potentiometers 157 and 158. Potentiometer 157 is a blow out temperature calibrator and potentiometer 158 is a maximum temperature calibrator, these potentiometers being effective in the control system during transient operation as will be explained in the operational description that follows.

*Steady state operation*

In considering the operation of the present apparatus during steady state conditions, it is assumed that the speed which has been selected by the power lever 30 will be the same as the speed indicated by the engine speed responsive device 88. As long as the selected speed and engine speed are within predetermined limits of each other the apparatus will stay in the steady state mode of operation. During the steady state mode of operation, the transfer control amplifier 55 will not be effective to energize either of the relays 56 or 67 and these relays will be in the position in which they are shown upon the drawing. When the relays 56 and 67 are deenergized the speed control portion of the apparatus will be controlling the operation of the motor 32 and the temperature control portion of the apparatus will be controlling the motor 33. Assuming that each of the sliders of all of the networks are centered on their respective potentiometers, it will be seen that no electrical signals will appear on the sliders when measured between the sliders and the grounded center taps of the respective secondaries of the power transformers. With no signals arising from any of the networks, it will be seen that there will be no signals applied to the inputs of either amplifier 35 or 36 so that the motors 32 and 33 controlled by these amplifiers will remain in a fixed position.

Considering now the speed control channel, assume that there has been a decrease in engine speed. When there is a decrease in the engine speed it is necessary to increase the fuel flow to the combustion chambers 14. The decrease in engine speed will be indicated by the speed indicator 88 moving the slider of the potentiometer 87 in an upward direction. Assuming the phasing of the alternating current transformer 86 to be such that the upper terminal is positive and the lower terminal of the secondary is negative, movement of the slider in an upward direction will result in a positive signal appearing upon the slider when measured with respect to the grounded center tap of the transformer 86. This positive signal will be fed from the slider of this potentiometer through the switch contact 61, switch blade 58, switch contact 72, switch blade 69 and summing resistor 91 into the input of amplifier 35. This signal will be effective to cause rotation of the motor 32 and the direction of rotation will be such as to effect an opening of the series regulating valve 17 to cause more fuel to flow to the nozzles 15. As the motor 32 moves, the followup slider of the potentiometer 95 will also be moved. Assuming the phasing of the transformer 94 to be such that the lower terminal of the potentiometer 95 is positive and the upper terminal thereof is negative, and with this slider moving in an upward direction, a negative voltage will appear on the slider when measured with respect to the grounded center tap of the transformer 94. This negative signal will be applied through the summing resistor 97 into the input of amplifier 35. The effect of the negative signal appearing on the input of amplifier 35 will be to cancel out the effect of the postive voltage arising from the speed indicating network 42 so that there will no longer be an effective input signal to amplifier 35 and it will no longer drive the motor 32. Inasmuch as the opening of the fuel valve 17 will have the effect of increasing fuel flow there will be a resultant increase in the temperature of the gasses within the chambers 14. This increase in the temperature of the gases will result in the gases exerting a greater force upon the blades of the turbine 11 as they expand therethrough. With the greater force exerted upon the blades of the turbine 11 there will be in increase in speed of the turbine and this increase in speed will be detected by device 88 which will in turn move the slider of the speed indicating potentiometer 87 back to the position where it was originally assumed to be. When the slider of this potentiometer 87 has moved back to this position there will be no output signal from the network 42 and the only signal remaining will be the negative signal from the rebalancing network 93. This rebalancing signal will be effective to cause the amplifier 35 to drive the motor 32 in the opposite direction to decrease the fuel flow and, neglecting any droop in the system, the system will be moved back to the position shown upon the drawing.

During the above explanation, no consideration was given to the operation of the velocity generator 98. The effect of this velocity generator 98 will be to feed an anti-hunting signal into the input of amplifier 35 through summing resistor 102. This anti-hunting signal is so phased that when the motor 32 is driving the velocity generator 98, and the rebalancing potentiometer 95, the output therefrom will be of the same polarity as the direction which the slider of potentiometer 95 is being moved, and will have the effect of causing a premature balance of the signal on the input of the amplifier 35. Thus, the motor 32 will not be effective to open and close the valve 17 to such a great extent and the system will have an opportunity to recover the desired speed before there has been over adjustment of the valve 17.

If a small adjustment should be made of the power lever 30 with the adjustment being made in the increased power direction or toward the right, the slider of the speed selecting potentiometer 81 will be moved toward the right. This movement of the slider of the potentiometer 81 will result in a positive signal appearing on the slider when measured with respect to the grounded center tap of transformer 80. This positive voltage will be fed into the input of amplifier 35 through the sensitivity potentiometer 82, switch contact 62, switch blade 59, switch contact 73, switch blade 70, and summing resistor 84. This positive signal will be effective to cause the amplifier 35 to drive the motor 32 in a fuel increasing direction. As the motor adjusts the fuel valve 17 to increase the fuel flow, the rebalancing network 93 will also be adjusted and will tend to eliminate the signal from the network 41. As long as the valve 17 is being opened there will be an increase in fuel flow and therefore a resultant increase in speed, which speed will be detected by the speed responsive means 88 and the increased speed will be effective to move the slider of potentiometer 87 in a downward direction so that the combined effects of the speed indicating network 42 and the rebalancing network 93 will tend to cancel out the speed selecting signal from the network 41. The system will thus be stabilized out at a newly selected speed.

Under the conditions assumed thus far there has been no signal arising from the calibrating network 40 inasmuch as it has been assumed that the sliders of the potentiometers 46, 47, and 48 have all been centered on their respective resistors so that there has been no output signals on any of the sliders. Under normal conditions the control apparatus will be set up so that signals do appear upon these potentiometers. In order to set the maximum speed calibration potentiometer 46 it is necessary that the power lever 30 be advanced to the maximum power position and when in that position the slider of potentiometer 46 will be adjusted until the actual engine speed is the speed that is desired for that particular setting of the power lever. In calibrating the control when the power lever is in the idle position, it is necessary that the power lever 30 be moved in a counterclockwise direction to the idle position. It is also necessary to calibrate for ground idle speed and maximum altitude idle speed. The speed biasing calibration is accomplished by adjusting the slider of potentiometer 48 when the bellows 50 is depressed to a point where the slider 49 is in the lower position on its associated resistor. For setting the maximum altitude idle speed bias the slider of potentiometer 49 is moved to the upper extreme position and the calibration adjustment is made by adjusting the slider of potentiometer 47. Inasmuch as the idle speed of the engine at various altitudes will vary with the different types of engines, it is possible with the present arrangement to have the idle speed increase or decrease with changes in altitude depending upon how the potentiometers 47 and 48 are adjusted. It will be obvious that when the bellows 50 is compressed at low altitudes the slider 49 will be moved in a downward direction and the signals arising from the ground idle potentiometer 48 will be predominant. Further, as the altitude of the apparatus is increased, the bellows 50 will expand and move the slider of the potentiometer 49 in an upward direction so that the ground idle potentiometer 48 will be faded out and the maximum altitude idle calibration potentiometer 47 will be faded in. It will further be noted that movement of the power lever 30 is effective to variably select the amount of calibration that is desired from the idle portion of the apparatus to the maximum speed portion. It will be obvious that when the power lever is in the maximum power position the slider of the fader potentiometer 51 will be in the right hand position and will be selecting the control signal from the maximum speed calibrating potentiometer 46 and the altitude biasing signal will have a minimum effect upon the signal appearing upon the slider of the potentiometer 51. Thus, when the slider for the potentiometer 51 is moved in the idle position, the signals arising from the idle speed fader potentiometer 49 will be predominant and the signals from potentiometer 46 will be at a minimum.

It will also be noted that the altitude control will have no effect upon the operation of the power lever 30 and the operator thereof will be able to have full movement of the power lever regardless of the adjustment that the altitude control might be effecting on the output of the calibration network 40. It will be obvious that the output signal from the calibration network 40, when fed through the summing resistor 53 to the input of amplifier 35 will have the same effect upon the amplifier as other control signals arising from the speed selecting network 41 or the speed indicating network 42.

Considering now the temperature control channel as it is effective to regulate the positioning of the eyelids 23 and 24, assume that the sliders of the respective potentiometers are centered upon their respective resistors so that there will be no electrical signals appearing upon the sliders when measured with respect to the grounded center taps of the transformers. Under these conditions no electrical signals will be fed into the amplifier 36 and the motor 33 controlled thereby will remain stationary.

In the event that the temperature on the upstream side of the turbine as sensed by the thermocouple 129 should drop, it is desired that the eyelids 23 and 24 be moved in a closed direction to decrease the exhaust nozzle area of the engine 10. The drop in temperature of the thermocouple 129 will be detected by the modulator and amplifier 128 which will in turn be effective to drive the motor 127. Assuming the phasing of the temperature indicating network 107 to be such that for the particular half-cycle under consideration the left hand terminal of the potentiometer resistor is negative and the right hand terminal is positive, a decrease in temperature will result in the motor 127 moving the slider of potentiometer 126 toward the right so that a positive signal will appear upon the slider when measured with respect to the grounded center tap of the transformer 125. This positive voltage will be fed through the summing resistor 135 into the input of amplifier 36 and the amplifier 36 will cause rotation of the motor 33 to effect an adjustment of the pilot valve 34. The pilot valve 34 will be effective to cause the hydraulic servomotor 25 to position the eyelids 23 and 24 through the toggle linkage 26 in a closed direction and will at the same time effect an adjustment of the slider of followup potentiometer 140. The movement of the slider of followup potentiometer 140 will be toward the right, and assuming the phasing to be such that the left hand terminal of the potentiometer is positive and the right hand terminal is negative, this movement will cause a negative signal to appear upon the slider when measured with respect to the grounded center tap of transformer 139. This negative signal will be fed through the sensitivity potentiometer 141 and suming resistor 142 to the input of amplifier 36 and will tend to cancel out the positive signal arising from the temperature indicating network 107. With the signals effectively cancelled out, the motor 33 will stop rotating and the servomotor 25 will come to rest.

The closing of the eyelids 23 and 24 will increase the back pressure on the turbine 11 and will increase the temperature of the gases on the upstream side of the turbine 11 so that the temperature of the thermocouple 129 will increase and will cause the modulator and amplifier 128 to reposition the motor 127 and the slider 126 back to its originally assumed position. With the slider of the potentiometer 126 repositioned to its originally assumed position, the signal from the rebalancing network 108 will be effective to apply to the input of the amplifier a predominantly negative signal which will cause the motor 33 to position the pilot valve 34 in the opposite direction so that the eyelids 23 and 24 will be moved by the hydraulic servomotor 25 back to their originally assumed position, neglecting any droop in the system and assuming the condition causing the temperature drop is no longer present.

The effect of the velocity generator 109 will be the same as the generator 98 and it will tend to stabilize the operation of the system by preventing the system from over-correcting when there has been a change.

If the power lever 30 should be moved in the increased power direction then the slider of the potentiometer 111 will be moved toward the right. Assuming the phasing of the transformer 110 to be such that the left hand terminal of the potentiometer resistor is negative and the right hand terminal is positive, there will be a voltage appearing between the slider and the grounded center tap of the transformer 110. This signal will be fed through the sensitivity potentiometer 111, switch contact 63, switch blade 60, switch contact 74, switch blade 71, and summing resistor 115 to the input of amplifier 36. This positive signal on the input of amplifier 36 will be effective to cause the motor 33 to rotate in a direction to effect closing of the eyelids 23 and 24. When the eyelids 23 and 24 move in a closed direction the rebalancing potentiometer slider will be moved toward the right to tend to counteract the positive signal arising from the temperature selecting network 105 and as the eyelids 23 and 24 close, the temperature of the engine will be increased and the modulator and amplifier 128 will cause the motor 127 to drive the slider of potentiometer 126 toward the left. The negative signal from the temperature indicating network 107 and the negative signal from the rebalancing network 108 when combined with the positive signal from the selecting network 105 will cancel out the positive signal and the amplifier 36 will no longer be effective to position the motor 33 and the apparatus will stabilize out at a new position which will be effective to maintain the engine temperature at the newly selected value.

Considering now the temperature calibrating network 106, as assumed above, the sliders of the maximum temperature calibration potentiometer 118 and the minimum calibration potentiometer 119 were centered so that there were no electrical signals appearing upon the respective sliders. Normally, the control apparatus will be set up by moving the power lever 30 to one extreme position or the other. Assuming that the slider is first moved to the minimum power position, the slider of the fader potentiometer 120 will be moved to the left hand terminal of the associated resistor so that the slider will be effectively connected to the slider of the minimum temperature calibrating potentiometer 119. When in this position the minimum temperature will be set up by making an adjustment of the calibration potentiometer 119 until the desired engine temperature is sensed. To calibrate for the maximum temperature, the power lever is moved to the maximum power position so that the slider of the potentiometer 120 is at the right hand terminal of its associated resistor and the slider is effectively connected to the slider with a maximum temperature calibration potentiometer 118. In order to set the desired temperature within the maximum power position the potentiometer 118 will be adjusted. It will be obvious that as the slider of the potentiometer 120 is moved between its two extreme positions, the calibration from the potentiometers 118 and 119 will be variably selected. This will have the effect of maintaining the calibration within fixed limits at either end.

The consideration of the control apparatus thus far has been concerned with the individual control channels. It will be quite obvious that there will be an interrelation between the two channels such that when the motor 32 operates and causes an increase in fuel flow to the engine to increase the engine speed there will also be a resultant increase in engine temperature and this increase in temperature will cause the motor 33 to tend to open the eyelids 23 and 24. However, the operation of the motor 33 will have little effect upon the eyelids because the time constant of the fuel control channel is considerably faster than the time constant of the temperature control channel which controls the eyelids 23 and 24. Thus, the fuel flow change necessary to correct an engine speed can be accomplished without there being any appreciable change in the eyelids 23 and 24. It will further be noted that when there is a decrease in engine temperature the motor 33 will be effective to close the eyelids 23 and 24 and this closing will result in a decrease in the pressure drop across the turbine 11 so that it will tend to decrease the engine speed. This decrease in engine speed will tend to cause the motor 32 to increase the fuel flow and, of course, the engine temperature. While there is this cross relation between the two control channels due to the cross relation of the functions within the engine 10, it will be obvious that there will be no adverse effects due to this as long as the time constant of the eyelid control is longer than the time constant of the fuel valve control.

Since engine speed and temperature are the prime functions which determine the overall operation of the engine, there must be coordination between these two functions so that the power may be varied. This coordination is accomplished by the power lever 30 which operates upon potentiometers of networks 40, 41, 105, and 106 and may be arranged so that the engine speed and temperature will be selected according to predetermined schedules determined by the particular engine to which the apparatus is attached.

In order to obtain military power from the present apparatus it is desired that fuel be supplied to afterburner nozzles 28 by means of the afterburner control 29. When the afterburner is in operation, it is also desired that the eyelids 23 and 24 be moved to the wide open position. In order to select military power, the power lever is moved to the extreme right hand position. When in this position the slider of the potentiometer 111 will move out of engagement with the slide wire resistor and will come into engagement with a contacting segment 112. When the slider engages this segment the slider on the potentiometer will be effectively connected to the left hand end of the secondary of transformer 110 which will mean that there will appear upon the slider, when measured with respect to ground, a negative signal and this negative signal will be fed into the amplifier 36 to cause the same to drive the motor 33 and to cause the eyelids 23 and 24 to be moved to the wide open position. When the power lever 30 is moved to the military power position the contactor 159 is moved from engagement with segment 160 and into engagement with the segment 161. When engaging 161 a positive signal will appear upon the contactor 159 when measured with respect to the grounded center tap of transformer 117 and this positive signal will cause operation of the afterburner control 29 so that fuel will flow to the afterburner. The apparatus will continue in this mode of operation until the power lever 30 is moved to the left, away from the military power position, and when this is done the apparatus will go back to the mode of operation assumed above with the afterburner control 29 being effectively deenergized and the eyelids 23 and 24 being controlled in accordance with a selected temperature.

*Transient operation*

The conditions assumed above have been considered solely with respect to steady state operation where the selected engine speed and the actual engine speed have always remained substantially the same, or have not differed by more than a predetermined amount. If the selected engine speed is greater than the actual engine speed by more than a predetermined amount or is less than the actual engine speed by more than a predetermined amount it is desired to change the control apparatus so that it will have a different mode of operation. This changing over of the mode of operation is to cause the engine speed to be changed back to the selected or desired value as soon as possible.

The changing over or transfer is accomplished by transfer control amplifier 55 and transfer relays 56 and 67. The control signals for the amplifier 55 are derived from the speed selecting network 41, the speed calibrating network 40 and the speed indicating network 42. The control signal from the network 40 is fed through the sensitivity control 52 and summing resistor 90 into the input of amplifier 55 while the signal from the selecting network 41 is fed through the sensitivity potentiometer 82 and summing resistor 83 to the input of amplifier 55. The output of the speed indicating network 42 is fed through the summing resistor 90 into the input of amplifier 55. As long as the electrical signals arising from the calibrating network 40 and the selecting network 41 are balanced out by the electrical signals arising from network 42 the amplifier 55 will be ineffective to energize either relay 56 or 67.

If the power lever 30 should be advanced suddenly so that it is impossible for the speed responsive device 88 to follow the movement of the power lever, there will be a signal arising from the network 41 which will be in a positive direction and the magnitude of this signal will be greater than the magnitude of the signal arising from the network 42. With this more positive signal appearing upon the input of amplifier 55 the relay 56 will be energized and the switch blades 58, 59, and 60 will move into engagement with the associated contacts 64, 65, and 66 respectively. When this relay operates, the temperature indicating signal arising from network 107 is effectively connected in controlling relation to the amplifier 35 and the fuel control motor 32. The control signal from the network 107 may be traced from the slider of the potentiometer 126 through conductors 170 and 171, switch contact 64, switch blade 58, switch contact 72, switch blade 69, and summing resistor 91 into the input of amplifier 35.

A temperature selecting signal is also effectively connected into the input of amplifier 35, this selecting signal being in effect a maximum temperature calibrating signal which is taken from the potentiometer 158 of network 155. This potentiometer 158 is preset to select a temperature which, during acceleration, the engine can safely operate for a limited time. The signal from this potentiometer is fed from the slider thereof through contact 65, switch blade 59, contact 73, switch blade 70 and summing resistor 84 into the input of amplifier 35. With the polarity of the network 155 assumed, for one particular half cycle, to be negative on the left hand terminal and positive on the right hand terminal, the electrical signal appearing upon the slider of potentiometer 158 will be positive when measured with respect to the grounded center tap of the transformer 156. This positive signal when appearing upon the amplifier 35 will be calling for an increased fuel flow and the motor 32 will be driven to open the fuel valve 17 to cause an increase in the fuel flow to the chambers 14. The fuel flow will continue to increase until such time as the thermocouple 129 indicates that the maximum acceleration temperature has been reached. When the maximum acceleration temperature has been reached the motor 127 will have driven the slider 126 toward the left so that the electrical signal upon the slider of the potentiometer 126 will be sufficiently negative to overcome the positive signal arising from the network 155 and the amplifier 35 will no longer supply power to drive the motor 32 to increase the fuel flow.

With this increased amount of fuel flowing into the chambers 14 the gas temperature will increase and the turbine will increase its speed. This increase in speed will be detected by the speed responsive device 88 and the slider of the potentiometer 87 in the speed indicating network 42 will be moved in a downward direction so that a more negative signal will be appearing upon the output of this network. When this more negative signal is fed into the input of amplifier 55 and is of sufficient magnitude to balance out the more positive signal arising from the network 41 due to the movement of the power lever 30 the amplifier 55 will no longer have an input signal. When the output relay 56 becomes deenergized the relay will return to the position in which it is shown on the drawing and the apparatus will continue under a steady state mode of operation with the engine speed in control of fuel flow rather than the engine temperature.

Under the transient operation assumed above no consideration was given to the eyelid control. When the acceleration relay 56 is energized it is desired that the eyelids 23 and 24 be moved in an opening direction. The effect of their moving in the opening direction will be to increase the pressure drop across the turbine 11 and therefore to increase the speed of the turbine. In order that movement of the eyelids 23 and 24 be a controlled one, it has been found desirable to open the eyelids by an amount proportional to the speed error existing. In other words, it is desired to open the eyelids 23 and 24 by an amount proportional to the difference between the selected speed and the actual speed.

The speed differential signal is fed into the temperature control channel through the transformer 150. Under the conditions assumed above, the power lever 30 was moved into the advanced power position so that there was a predominantly positive signal appearing upon the input of amplifier 55 and this positive signal is applied to the transformer winding 151 and is phased such that its upper terminal is positive with respect to the lower terminal. When the signal passes through the transformer to the secondary 152 the signal is reversed in polarity such that the upper terminal is negative and the lower terminal is positive. This signal will be added to the signal arising from the temperature selecting network 105 and if the slider of the network 105 has been moved into the advanced power position a positive signal will appear upon the slider of potentiometer 111. This positive signal is counter balanced or overcome by the negative signal appearing upon the secondary of transformer 150 and these two signals are fed from the slider potentiometer 111 through sensitivity potentiometer 113, secondary 152, switch contact 66, switch blade 60, switch contact 74, switch blade 71, and summing resistor 115 into the input of amplifier 36. If the negative signal from the transformer 150 overcomes the positive signal from the selecting network 105, the motor 33 will be driven in a direction to cause the opening of the eyelids 23 and 24. As soon as the acceleration relay 56 has become deenergized upon the actual engine speed reaching the selected speed, the electrical signal arising in the transformer 150 will be cut out of the temperature control portion of the apparatus as it affects the eyelids 23 and 24 and only the signals arising from the selecting network 105 will be operating through the summing resistor 115 into the input of amplifier 36.

Should the power lever 30 be moved from a high power position to a low power position at a rate greater than the speed of the engine 10 or the indicator 88 can follow, it is also desired that the apparatus be switched over to a different mode of operation than is used during a normal or steady state mode of operation. When the power lever 30 is moved in a direction last assumed there will be arising from the speed selecting network 41 a predominately negative signal and this negative signal will be fed into the input of amplifier 55. Inasmuch as initially the electrical signal from the speed indicating network 42 will not have changed, this negative signal on the input of amplifier 55 will be predominant and the phasing will be such as to cause operation of the deceleration relay 67. When this relay becomes energized the switch blades 69, 70, and 71 will move into engagement with their associated contacts 75, 76 and 77. When the switch blade 69 engages contact 75 the temperature indicating network 107 will be effectively connected to the input of amplifier 35 through the conductors 170 and 171, switch contact 75, switch blade 69 and summing resistor 91.

When the switch blade 70 engages contact 76, and moves out of engagement with contact 73, the speed selecting signal from the network 41 is no longer fed into the input of amplifier 35 and the minimum blowout temperature calibrator is substituted therefor. This calibration potentiometer 157 is so adjusted that it will select an engine temperature which will prevent the blowing out of the flame in chambers 14. It will be obvious with the above assumed polarities on the network 155, with the left hand terminal negative and the right hand terminal positive, the electrical signal appearing upon the slider of the blowout calibration potentiometer 157 will be negative when measured with respect to the grounded center tap of the transformer 156. This negative signal, when fed into the input of amplifier 35, will be effective to cause the motor 32 to be driven in a fuel decreasing direction. As the fuel begins to decrease there will be a resultant decrease in the temperature of the engine and this will be detected by the thermocouple 129 which will be effective when acting through the modulator and amplifier 128 to cause motor 127 to reposition the slider of potentiometer 126 in a more positive direction. As soon as the positive signal from the network 107 balances out the negative signal arising from the calibration potentiometer 157, there will be no effective signal on the input of amplifier 35 and there will be no further reduction in the fuel flow. This arrangement will always insure that there is sufficient fuel flowing into the combustion chambers 14 to maintain a flame therein.

When the switch blade 71 engages contact 77 the electrical signal appearing upon the transformer 150 will again be added in series with the signal from the temperature selecting network 105 and the phasing of this signal from the transformer 150 as it appeared upon the winding 152 will be such as to tend to cause a closing of the eyelids 23 and 24. This closing movement is desirable inasmuch as it is desired to decrease the speed of the turbine and the closing thereof will cause a decrease in the pressure drop across the turbine so that the turbine will tend to decrease its speed. In this case when the deceleration relay 67 is energized the temperature selecting signal from network 105 will be fed through the winding 152, contact 77, switch blade 71, and summing resistor 115 into the input of amplifier 36. If the signal arising from the transformer 150 is equal to or greater than the signal from the temperature selecting network 105 the signal appearing on the input of amplifier 36 will be such as to cause closing of the eyelids 23 and 24.

As soon as the indicated speed has reached the value of the selected speed the amplifier 55 will deenergize the relay 67 and the apparatus will be in the position shown upon the drawing and will be operating in the steady state or normal mode of operation.

It will be noted that the speed calibrating network 40 is continuously connected to the input of amplifier 35 through the summing resistor 53. In nearly all installations this connection will have no adverse effect because the electrical signals arising from the network 40 are relatively small when compared with the signals arising from the other control networks of the apparatus which are connected to the input of amplifier 35. Further, particularly when decelerating the engine, it is desirable to have an altitude correction on the input of the amplifier 35 to compensate for changes in blowout temperature, as it varies with altitude.

Conclusion

From the foregoing it will be seen that there has been provided an improved control for a combustion engine where the fuel flow is under steady state conditions is controlled by engine speed and gas flow is controlled by engine temperature until an acceleration or deceleration condition is present. When an acceleration or deceleration condition is present, engine temperature is switched to control fuel flow and gas flow is adjusted in accordance with the difference between engine speed and selected speed. Further, there has been provided a new and improved calibration arrangement for the apparatus wherein compensation for changes in altitude may be accomplished and also where two point calibration may be accomplished. It is to be understood that the present control has a great deal of flexibility in it which makes it readily adaptable to any type of jet or gas turbine engine. Thus, production controls for any particular type of engine may be greatly simplified by eliminating some of the calibration and sensitivity adjustments now used. Further, while parallel summing has been shown, as relates to the combining of the control signals, it is to be understood that series summing may also be used.

While the present invention has been specifically disclosed, it is to be understood that this has been done for clarity of description only. Obviously, many modifications and equivalents will be apparent to one skilled in the art, hence the scope of this invention should be determined only by the appended claims.

We claim as our invention:

1. Control apparatus for a variable speed combustion engine having fuel flow control means and exhaust gas flow control means, the combination comprising, engine speed selecting means, engine speed responsive means, first motor means arranged to control the fuel flow control means, means connecting said speed selecting means and said speed responsive means in controlling relation to said first motor means, second motor means arranged to control the exhaust gas flow control means, engine temperature responsive means responsive to a temperature indicative of engine operation, means connecting said temperature responsive means in controlling relation to said second motor means, control means connected to said speed selecting means and said speed responsive means and arranged to be actuated upon the occurrence of a predetermined differential between selected speed and actual speed, and means including said control means for connecting said second motor means to said speed selecting means and said speed responsive means to effect movement of said second motor means by an amount proportional to the difference between selected speed and actual speed.

2. Control apparatus for a variable speed combustion engine having fuel flow control means and gas flow control means, the combination comprising, engine speed selecting means, engine speed responsive means, first motor means arranged in fuel flow controlling relation to the fuel flow control means, second motor means arranged for controlling the gas flow control means, control means arranged to be actuated upon the occurrence of a predetermined differential between the selected speed and the actual speed, means operatively connecting said speed selecting means and said speed responsive means to said first motor means, and means including said control means for alternatively connecting said speed responsive means and said speed selecting means in operation controlling relation to said second motor means.

3. Control apparatus for a variable speed combustion engine having fuel flow control means and gas flow control means, the combination comprising, engine speed control means including means responsive to engine speed, first motor means, means operatively connecting said speed control means to said first motor means, said first motor means being arranged for connection to the fuel flow control means, engine temperature control means including means responsive to a condition influenced by engine combustion, second motor means, means operatively connecting said temperature control means to said second motor means, said second motor means being arranged for connection to the gas flow control means, and means operatively connecting the speed control means in controlling relation to said second motor means and said temperature control means in controlling relation to said first motor means.

4. Control apparatus for a combustion engine having fuel flow control means and exhaust gas flow control means, the combination comprising, engine speed selecting means, engine speed responsive means, first motor means arranged to be connected to the fuel flow control means, means connecting said speed selecting means and said speed responsive means to said first motor means in a manner to cause operation of said motor means upon a difference between selected speed and sensed speeds, second motor means arranged to be connected to the exhaust gas flow control means, transfer means arranged to be actuated upon a predetermined engine operating condition occurring, means including said transfer means for connecting said speed selecting means and said speed responsive means in a manner to cause operation of said second motor means when the predetermined condition occurs.

5. Control apparatus for a variable speed combustion engine of a sort adapted to be operated at varying altitudes, having fuel flow control means and exhaust gas flow control means, the combination comprising, manually operated speed selecting means, engine speed responsive means, altitude speed biasing control means, means connecting said selecting means, said responsive means and said biasing means in a manner to control the operation of a first motor means, said first motor means being arranged for controlling the fuel flow control means, second motor means arranged for controlling the exhaust gas flow control means, relay means, means including said relay means for connecting said speed selecting means, said speed responsive means and said speed biasing means in a manner to control the operation of said second motor means when said relay means is operated in a predetermined manner.

6. Control apparatus for a variable speed combustion engine of a sort adapted to be operated at varying altitudes and having fuel flow control means and exhaust gas flow control means, the combination comprising, first motor means arranged to control the fuel flow control means, second motor means arranged to control the exhaust gas flow control means, engine speed selecting means, engine speed responsive means, altitude responsive speed biasing means, means connecting said speed selecting means, said speed responsive means, and said speed biasing means collectively in a manner to control said first motor means, engine temperature responsive means responsive to a temperature significant of engine operation, means connecting said temperature responsive means in a manner to control said second motor means, responsive means, responsive to the summation of the outputs of said speed selecting means, speed responsive means, and altitude responsive means and means including said responsive means for connecting said temperature responsive means in a manner to control said first motor means and for connecting said speed selecting means, said speed responsive means, and said speed biasing means in a manner to control said second motor means.

7. Control apparatus for a variable speed combustion engine having fuel flow control means and gas flow control means, the combination comprising, first motor means arranged for controlling the fuel flow control means, second motor means arranged for controlling the gas flow control means, engine speed control means, means connecting said speed control means to operatively control said first motor means, engine temperature responsive means responsive to a temperature which is a measure of engine operation, engine temperature selecting means, means connecting said temperature responsive means and said temperature selecting means to operatively control said second motor means, transfer means, and means including said transfer means for operatively connecting said temperature responsive means to said first motor means and said speed controlling means, with said temperature selecting means connected, to said second motor means.

8. Control apparatus for a variable speed combustion engine having gas flow control means and fuel control means, the combination comprising, speed control means, first motor means, said first motor means being arranged to control the fuel flow control means, means operatively connecting said speed control means for controlling said first motor means, second motor means, said second motor means being arranged to control the gas flow control means, temperature responsive means responsive to a temperature indicative of engine operation, means operatively connecting said temprature responsive means for controlling said second motor means, a transfer controller, said controller comprising a first relay which is actuated upon said controller indicating a deceleration condition and a second relay which is actuated upon said controller indicating an acceleration condition, means including said first relay for operatively connecting said speed control means to said second motor means and said temperature responsive means to said first motor means, and means including said second relay for operatively connecting said speed control means to said second motor means and said temperature responsive means to said first motor means.

9. Control apparatus for a variable speed combustion engine having fuel flow control means and gas flow control means, the combination comprising, a transfer controller, said controller comprising a first relay which is actuated upon the occurrence of an acceleration condition and a second relay which is actuated upon the occurrence of a deceleration condition, engine temperature responsive means responsive to a significant engine temperature, first motor means arranged to control the fuel flow control means, second motor means arranged to control the gas flow control means, means normally connecting said temperature responsive means in controlling relation to said second motor means, a maximum acceleration temperature calibrator, means including said first relay when actuated for connecting said maximum acceleration temperature calibrator and said temperature responsive means in controlling relation to said first motor means, a minimum temperature calibrator, and means including said second relay when actuated for connecting said minimum temperature calibrator and said temperature responsive means in controlling relation to said first motor means.

10. Control apparatus for a variable speed combustion engine of a sort adapted to be operated at varying altitudes having fuel flow control means and gas flow control means, the combination comprising, first motor means arranged for controlling the fuel flow control means, second motor means arranged to control the gas flow control means, altitude responsive means, means including said altitude responsive means connected in an operative manner to said first motor means, speed responsive means, means including said speed responsive means for connecting said altitude responsive means in an operative manner to said second motor means.

11. Control apparatus for a variable speed combustion engine of a sort adapted to be operated at varying altitudes having fuel flow control means and exhaust gas flow control means, the combination comprising, first motor means arranged to control the fuel flow control means, second motor means arranged to control the exhaust gas flow control means, idle speed calibrating means, maximum speed calibrating means, altitude responsive means, means connecting said altitude responsive means in a manner to adjust said idle speed calibration means, a manually operated speed selector, means interconnecting said selector and said maximum and idle speed calibration means so that the effect of the idle speed calibrating means and the maximum speed calibrating means will be varied as the selector is adjusted from a minimum position to a maximum position, means connecting said selector as affected by said maximum calibration means and said idle calibration means in a manner to control said first motor means, and transfer means operable as a function of speed for connecting said second motor means to said manually operated speed selector.

12. Control apparatus for a variable speed combustion engine of a sort adapted to be operated at varying altitudes having fuel flow control means, the combination comprising, motor means arranged to control the fuel flow control means, a manually positioned power selector, engine speed selecting means, engine speed calibrating means, said calibrating means comprising a maximum speed calibrating means and an altitude responsive idle speed calibrating means, a speed calibration selector arranged to vary the effect of said maximum speed calibrating means and said idle speed calibrating means, means connecting the selecting means of said speed selector to said power selector, means connecting the selector of said calibrating means to said power selector, and means operatively connecting both of said selectors in a manner to control said motor means.

13. Control apparatus for a variable speed combustion engine of a sort wherein fuel and gases are provided for combustion and having gas flow control means and fuel flow control means, the combination comprising, a manually positioned power lever, first motor means arranged to control a fuel flow control means, second motor means arranged to control the gas flow control means, an engine speed calibrating signal source, an engine speed selecting signal source, engine speed indicating source means connecting said speed calibrating signal source, said engine speed indicating source and said speed selecting signal source in a manner to control the operation of said first motor means, an engine temperature calibrating signal source, engine temperature indicating signal source indicating a temperature representative of engine operation, an engine temperature selecting signal source, means connecting said temperature calibrating, said temperature indicating and said temperature selecting signal sources in a manner to control the operation of said second motor means, and means interconnecting said speed calibrating source, said speed selecting source, said temperature selecting source, said temperature calibrating source and said power lever so that movement of said power lever will adjust the output signals from all of said sources.

14. Control apparatus for a variable speed combustion engine of a sort wherein fuel and gases support combustion and having gas flow control means and fuel flow control means, the combination comprising, first motor means arranged to control the fuel flow control means, second motor means arranged to control the gas flow control means, speed control means, temperature control means, means operatively connecting said speed control means in controlling relation to said first motor means, means operatively connecting said temperature control means in controlling relation to said second motor means, transfer control means, means connecting said speed control means in a manner to control the operation of said transfer control means, means including said transfer control means for operatively connecting said temperature responsive means in controlling relation to said first motor means, and means including said transfer control means for operatively connecting said speed control means in controlling relation to said second motor means, said last named means connecting said speed control means to said second motor means with a signal effect which is opposite the effect of the speed control means upon said transfer control means.

15. Control apparatus for a variable speed combustion engine of a sort burning fuel in combustion supporting gases and having an auxiliary after burner and also having fuel flow control means and gas flow control means and an auxiliary after burner control means, the combination comprising, a manually positioned power lever, first motor means arranged for controlling the gas flow control means, second motor means arranged for controlling fuel flow control means, an electrical circuit for initiating operation of the after burner control means, speed control means, engine temperature control means responsive to a temperature indicative of engine operation, means connecting said temperature control means in controlling relation to said first motor means, means connecting said speed control means in controlling relation to said second motor means, means interconnecting said speed and temperature control means for variably adjusting in the effect of said control means upon said first and second motor means, and means actuated upon said power lever selecting a predetermined temperature control signal for causing said first motor means to assume a predetermined position, and switch means actuated by said power lever and moved to said predetermined position for supplying an energizing signal to said electrical circuit so that the after burner control means will be rendered operative.

16. In apparatus for controlling an engine, first control means operative to reversibly vary the operation of said engine, second control means operative to reversibly vary the operation of said engine, said first control means including means responsive to a first engine operating condition affected by operation of said first control means, said second control means including means responsive to a second and different engine operating condition affected by operation of said second control means, and transfer means responsive to a predetermined demand for change of said first condition operative to switch said means responsive to a second condition in reversible controlling relation to said first control means and said means responsive to a first condition in reversible controlling relation to said second control means.

17. In control apparatus, first control means operative to reversibly vary the operation of an engine, second control means operative to reversibly vary the operation of said engine, said first control means including first means responsive to a first engine operating condition indicative of the need for operation of said first control means, said second control means including second means responsive to a second and different engine operating condition indicative of the need for operation of said second control means, transfer means responsive to a predetermined demand for change of said first engine operating condition operative to switch said means responsive to a second condition in revesible controlling relation to said first control means.

18. In apparatus for controlling an engine, first control means operative to reversibly vary the operation of the engine, second control means operative to reversibly vary the operation of the engine, said first control means including means responsive to a first engine operating condition affected by operation of said first control means, said second control means including means responsive to a second and different engine operating condition affected by operation of said second control means, and transfer control means responsive to a demand for change of said first condition in excess of a predetermined amount operative to connect said second means in a reversible controlling relation to said first control means and said first means in a reversible controlling relation to said second control means.

19. A system for controlling temperature in an aircraft engine equipped with a variable area exhaust nozzle mechanism comprising means for creating a signal representing a desired engine operating temperature, means for creating a signal representing actual engine temperature, means for deriving a resultant signal from said signals having a magnitude proportional to the difference between actual and desired engine temperatures and having a polarity which is determined by the relative magnitudes of the aforesaid temperatures, means responsive to said resultant signal operatively associated with said mechanism and including an electric motor, and means for modifying said resultant signal including a device for producing a signal having its magnitude and phase dependent upon the rate and direction of rotation of said motor.

20. An electrical system comprising means for developing a signal representing a first condition, switching means for connecting the signal to an external utilization circuit, said last named means including an electrical coordinating device controlled by predetermined values of a second condition, a mechanism for sensing said second condition, and means for automatically varying the values of said second condition.

21. An electrical system comprising means for developing a signal representing a first condition, switching means for connecting the signal to an external utilization circuit, said last named means including an electrical coordinating device controlled by a second condition, a mechanism for sensing said second condition, and means for varying the condition sensed as a function of a third condition.

22. An electrical control system comprising means for producing a signal representing a preselected temperature condition, switching means for connecting the signal to an external utilization circuit, said last named means including an electrical coordinating device controlled as a function of a second condition, a mechanism for sensing said second condition, and means for modifying said signal as a function of a third condition.

23. A control system for an aircraft gas turbine engine having a fuel supply and variable area discharge nozzle, said system including means responsive to engine speed, means for varying the supply of fuel to said engine, means connecting said speed responsive means in controlling relation to said fuel supply varying means, means responsive to a temperature indicative of turbine temperature, means for varying the area of said discharge nozzle, means connecting said temperature responsive means in controlling relation to said nozzle area varying means, means for correlating the control of said fuel supply and said temperature control of discharge area and for varying the speed and temperature of said engine, and means operable in accordance with an adjustment of speed of said engine in a direction requiring acceleration of said engine speed to cause said variable discharge area to be increased beyond the value normally obtained by said temperature control alone.

24. A control system for a gas turbine jet propulsion engine, the said engine comprising a combustion device, means for supplying fuel thereto, an exhaust nozzle, and means for varying the area of the nozzle; the said control system comprising, in combination, means responsive to a temperature in the turbine of the engine means for transmitting a temperature control signal, and means responsive to the two last-mentioned means for varying the area of the turbine exhaust nozzle to match the measured temperature with the temperature signal; means responsive to the rotational speed of the turbine, means for transmitting a speed control signal, and means responsive to the two last-mentioned means for varying the supply of fuel to the engine to match the rotational speed with the signal; and means for coordinating the transmitted speed and temperature control signals.

25. Control apparatus for a combustion engine of a sort burning fuel in combustion supporting gases and having an auxiliary afterburner and also having fuel flow control means and exhaust gas flow control means and after burner control means, the combination comprising, a manually positioned power lever, motor means arranged for controlling the gas flow control means, engine temperature control means having means responsive to a temperature significant of engine operation, said temperature control means being connected in controlling relation to said motor means, means including said power lever for adjusting said temperature control means to select a predetermined temperature to cause said motor means to drive the gas flow control means in an open direction whenever the selected temperature is exceeded, electrical circuit means arranged for energizing the after burner control means, means including said power lever when adjusted in the maximum position for connecting a fixed control signal source in controlling relation to said motor means to cause said motor means to move the gas flow control means to a maximum gas flow control position, and further means actuated by said power lever when moved to said predetermined position for supplying an energizing voltage to said after burner control means to cause the same to be operative.

References Cited in the file of this patent

UNITED STATES PATENTS

| | | |
|---|---|---|
| 1,312,899 | Pelterie | Aug. 12, 1919 |
| 2,434,189 | Ziebolz | Jan. 6, 1948 |
| 2,474,018 | Sparrow | June 21, 1949 |
| 2,482,254 | Fairchild | Sept. 20, 1949 |
| 2,485,431 | Chudyk | Oct. 18, 1949 |
| 2,489,586 | Ray | Nov. 29, 1949 |
| 2,514,513 | Price | July 11, 1950 |
| 2,520,434 | Robson | Aug. 29, 1950 |
| 2,540,916 | Sparrow | Feb. 6, 1951 |
| 2,575,879 | Lombard | Nov. 20, 1951 |
| 2,641,105 | Drake | June 9, 1953 |
| 2,697,908 | Offner | Dec. 28, 1954 |
| 2,699,646 | Baker | Jan. 18, 1955 |
| 2,705,864 | Peters | Apr. 12, 1955 |
| 2,762,194 | Kunz et al. | Sept. 11, 1956 |
| 2,820,340 | Dolza et al. | Jan. 21, 1958 |
| 2,958,186 | Mock | Nov. 1, 1960 |

FOREIGN PATENTS

| | | |
|---|---|---|
| 254,367 | Switzerland | Dec. 16, 1948 |